(12) United States Patent
Dünnebeil

(10) Patent No.: US 10,421,674 B2
(45) Date of Patent: Sep. 24, 2019

(54) PROCESS AND PLANT FOR SEPARATING OFF AND/OR RECOVERING NITROGEN COMPOUNDS FROM A LIQUID OR SLUDGE SUBSTRATE

(71) Applicant: Andreas Dünnebeil, Teltow (DE)

(72) Inventor: Andreas Dünnebeil, Teltow (DE)

( * ) Notice: Subject to any disclaimer, the term of this patent is extended or adjusted under 35 U.S.C. 154(b) by 0 days.

(21) Appl. No.: 15/628,341

(22) Filed: Jun. 20, 2017

(65) Prior Publication Data
US 2017/0369345 A1    Dec. 28, 2017

(30) Foreign Application Priority Data

Jun. 28, 2016 (DE) .......................... 10 2016 211 664

(51) Int. Cl.
| | |
|---|---|
| *B01D 53/58* | (2006.01) |
| *C02F 3/28* | (2006.01) |
| *C02F 1/58* | (2006.01) |
| *B01D 53/73* | (2006.01) |
| *C05F 17/00* | (2006.01) |

(Continued)

(52) U.S. Cl.
CPC .............. *C02F 1/586* (2013.01); *B01D 53/58* (2013.01); *B01D 53/73* (2013.01); *C02F 1/20* (2013.01); *C02F 3/286* (2013.01); *C02F 3/2893* (2013.01); *C05F 17/0027* (2013.01); *B01D 53/75* (2013.01); *B01D 2251/50* (2013.01); *B01D 2251/70* (2013.01); *C02F 11/04* (2013.01); *C02F 2101/16* (2013.01);

(Continued)

(58) Field of Classification Search
None
See application file for complete search history.

(56) References Cited

U.S. PATENT DOCUMENTS

| | | | |
|---|---|---|---|
| 4,710,300 A | 12/1987 | Kristoufek | |
| 5,510,094 A * | 4/1996 | Bhat ................. | B01D 53/501 423/243.07 |

(Continued)

FOREIGN PATENT DOCUMENTS

| | | |
|---|---|---|
| DE | 3901404 A1 | 8/1989 |
| DE | 4239637 C1 | 4/1994 |
| DE | 102014212827 A1 | 1/2016 |

OTHER PUBLICATIONS

C. Wetter, "Optimierte Nutzung von Nährstoffen aus Biogasanlagen durch Ammoniakstrippung und Gärrestaufbereitung", University of Münster 2008.

*Primary Examiner* — Sheng H Davis
(74) *Attorney, Agent, or Firm* — Brannen Law Office, LLC

(57) ABSTRACT

The invention relates to a process for separating off and/or recovering nitrogen compounds, in particular for separating off ammonia and/or recovering or producing nitrogen fertilizer, from a liquid or sludge substrate, in which a liquid or sludge substrate is introduced into a degassing vessel to which subatmospheric pressure is applied and ammonia gas formed is introduced by means of a vacuum pump into at least one scrubber which is located downstream of the degassing vessel and to which subatmospheric pressure is applied and into which acid is introduced, wherein the acid or an ammonium salt-containing liquid obtained in the at least one scrubber is taken off from the at least one scrubber, cooled and subsequently sprayed back into the at least one scrubber. The invention further relates to a plant for carrying out such a process.

23 Claims, 1 Drawing Sheet

(51) Int. Cl.
*C02F 1/20* (2006.01)
*C02F 101/16* (2006.01)
*C02F 11/04* (2006.01)
*B01D 53/75* (2006.01)

(52) U.S. Cl.
CPC ...... *C02F 2209/02* (2013.01); *C02F 2209/06* (2013.01); *Y02P 20/145* (2015.11); *Y02W 30/43* (2015.05)

(56) References Cited

U.S. PATENT DOCUMENTS

| | | | |
|---|---|---|---|
| 6,019,816 A * | 2/2000 | Lim | B01D 53/0415 95/212 |
| 6,464,875 B1 * | 10/2002 | Woodruff | C02F 1/586 210/603 |
| 7,887,615 B2 | 2/2011 | Spindler et al. | |
| 8,241,389 B2 | 8/2012 | Spindler et al. | |
| 2003/0059352 A1 * | 3/2003 | Karras | B01D 53/501 422/170 |
| 2006/0006055 A1 * | 1/2006 | Bonde | B01D 3/346 203/73 |
| 2011/0244555 A1 * | 10/2011 | Gunther | B01D 53/1425 435/266 |
| 2012/0251418 A1 * | 10/2012 | Sieder | B01D 53/1406 423/210 |
| 2013/0029405 A1 * | 1/2013 | Hickey | C01C 1/26 435/266 |

* cited by examiner

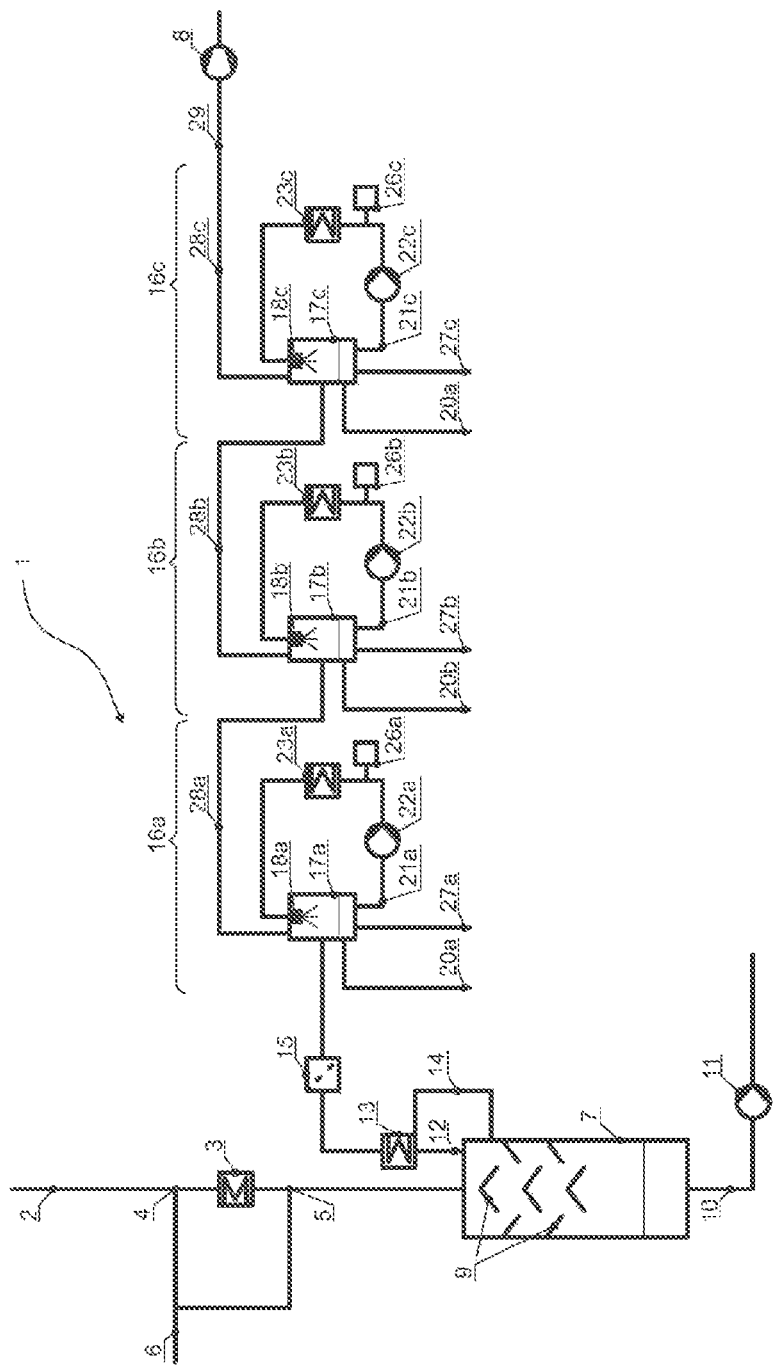

PROCESS AND PLANT FOR SEPARATING OFF AND/OR RECOVERING NITROGEN COMPOUNDS FROM A LIQUID OR SLUDGE SUBSTRATE

This United States utility patent application claims priority on and the benefit of German (DE) patent application number 10 2016 211 664.9, filed Jun. 28, 2016, the entire contents of which are hereby incorporated herein by reference.

BACKGROUND OF THE INVENTION

1. Field of the Invention

The invention relates to a process for separating off and/or recovering nitrogen compounds from a liquid or sludge substrate and also a plant for separating off and/or recovering nitrogen compounds from a liquid or sludge substrate.

Nitrogen compounds can interfere in various processes.

For example, ammonia formed in the fermentation process can inhibit the anaerobic methanation process in biogas plants. According to information from the Bavarian Institute for Agriculture (LfL), such ammonia inhibition commences at a total ammonia concentration of above 500 mg/l. The extent of ammonia inhibition is dependent firstly on the substrates fed to the anaerobic treatment and secondly on the process parameters temperature and pH. Thus, nitrogen-rich substrates promote the formation of ammonia. In a solution in water, ammonia is in chemical equilibrium with ammonium ($NH_4^+$). A rising pH, i.e. an increasing $OH^-$ concentration, leads to an increase in the ammonia concentration in the fermentation substrate. A rise in the temperature has a corresponding influence on the ammonia concentration.

A further factor for high ammonium/ammonia loadings in anaerobic processes can be internal reloading from dewatering of the fermentation residues obtained after the anaerobic process. This process variant occurs predominantly in biogas plants.

In the case of sewage treatment plants, after the anaerobic process, namely putrefaction, the putrefaction sludge is usually dewatered and the nitrogen-containing water which has been separated off from the sludge is recirculated to the sewage treatment plant. There, the water is then usually converted in an energy-consuming nitrification-denitrification process into nitrogen which disappears into the atmosphere. In some plants, this highly polluted process is treated as a separate stream.

In sewage treatment plants in which the sewage treatment sludge is dried, a further highly nitrogen-containing process stream is frequently obtained from the condensed vapour. This is usually also recirculated to the sewage treatment process. The nitrogen is then usually likewise at least partly removed in a nitrification-denitrification process.

2. Description of the Related Art

Various approaches can thus lead to a reduction in the nitrogen loading both directly in the anaerobic fermentation and also in the back-pollution into the total plant.

DE 39 01 404 A1 discloses a process in which putrefaction sludge is removed from putrefaction and ammonia is separated off from the discharged putrefaction sludge. The putrefaction sludge which has been freed of ammonia is subsequently returned to putrefaction. This reduces the ammonia concentration and thus the risk of ammonia inhibition. The ammonia can be separated off by means of stripping with an inert gas or steam and optionally an additional reduction in pressure.

Furthermore, a process in which aqueous ammonia is produced from a fermentation residue by utilization of the thermal energy from a combined heating-power station under reduced pressure is known. Nitrogen is discharged from the process with the aqueous ammonia. The aqueous ammonia can then be processed further (C. Wetter: "Optimierte Nutzung von Nährstoffen aus Biogasanlagen durch Ammoniakstrippung and Gärrestaufbereitung", University of Münster 2008).

U.S. Pat. No. 4,710,300 relates to a process in which ammonia is separated off from a substrate with introduction of heat and the vapours formed here are subsequently condensed. The aqueous ammonia formed can, for example, be converted into ammonium carbonate by introduction of carbon dioxide. Carbon dioxide present in biogas can, for example, be utilized for this purpose.

DE 10 2014 212 827 A1 describes a process for mechanical stripping of ammonia and carbon dioxide. In the process, ammonia is driven off from a fermentation substrate or fermentation residue by means of forced mechanical milling. The forced milling can be aided by adaptation of pressure, temperature and pH.

The documents DE 103 54 063 A1, DE 10 2005 017 077 A1 and DE 10 2004 053 297 A1 in each case disclose a process for obtaining nitrogen fertilizer from organic waste products in the liquid phase and also for sanitizing the wastes and for reducing emissions by thermal treatment using mineral or organic additives. The process is based on vacuum stripping at temperatures in the range from 40° C. to 90° C., with a larger gas stream being circulated through a mineral-aqueous suspension. A gas which is given off here and contains carbon dioxide and ammonia is cooled and passed into a mineral-aqueous suspension. The subatmospheric pressure generated at the beginning of the process by means of a vacuum pump is maintained autogenously by the course of the process.

In the ANAStrip® process, ammonium nitrogen is driven off in the form of ammonia from fermentation residues in batch operation at from 50° C. to 85° C. and slightly subatmospheric pressure and is subsequently converted into ammonia sulphate in aqueous solution by reaction with an absorption medium.

A process and an apparatus for removing ammonium-containing compounds from wastewater with the aid of steam is known from DE 42 39 637 C1.

Thus, there is a need for the present invention.

SUMMARY OF THE INVENTION

In the light of the above, the present invention addresses the problem of providing an improved process for separating off and/or recovering nitrogen compounds and also an improved plant for separating off and/or recovering nitrogen compounds, in which the removal and/or recovery of nitrogen compounds can be carried out more efficiently and in particular more quantitatively.

This problem is solved by a process having the features of independent claim 1 and by a plant having the features of independent claim 20. Preferred embodiments are described in the dependent claims. The wording of all claims is hereby expressly incorporated by reference into the contents of the present description.

According to a first aspect, the invention provides a process for separating off and/or recovering nitrogen compounds, in particular for separating off ammonia and/or recovering or producing nitrogen fertilizer, from a liquid or sludge substrate.

In the process, a liquid or sludge substrate is introduced into a degassing vessel to which subatmospheric pressure is applied, i.e. into a degassing vessel under subatmospheric pressure, and ammonia gas formed is introduced by means of a vacuum pump into at least one scrubber which is located downstream of the degassing vessel and to which subatmospheric pressure is applied and into which acid is introduced, i.e. into at least one scrubber which is under subatmospheric pressure and is located downstream of the degassing vessel and is supplied with acid, wherein the acid or an ammonium salt-containing liquid obtained in the at least one scrubber is taken off from the at least one scrubber, cooled and subsequently sprayed back into the at least one scrubber.

For the purposes of the present invention, the expression "nitrogen compounds" preferably refers to ammonia and/or ammonium salts, for example ammonium phosphate, ammonium sulphate and/or ammonium nitrate.

For the purposes of the present invention, the expression "nitrogen fertilizer" refers to nitrogen-containing, in particular ammonium salt-containing fertilizers, or fertilizers in the form of ammonium salts, for example ammonium sulphate and/or ammonium nitrate.

For the purposes of the present invention, the expression "liquid substrate" refers to a liquid and nitrogen-containing, in particular liquid and ammonium salt-containing, substrate, preferably a liquid substrate having organic constituents such as carbohydrates or monosaccharides, oligosaccharides and/or polysaccharides (sugar, starch, hemicellulose, cellulose), amino acids, peptides, proteins, fats, lipids, fatty acids and/or other organic compounds. The liquid substrate can be, for example, a putrefaction sludge, liquid manure, liquid fermented manure, liquid fermentation substrate or liquid fermentation residue.

For the purposes of the present invention, the expression "manure" refers to a naturally obtained agricultural fertilizer which consists mainly of urine and faeces from farm animals.

For the purposes of the present invention, the expression "fermentation substrate" refers to a substrate produced in biogas plants and/or sewage treatment plants by means of an anaerobic fermenter.

For the purposes of the present invention, the expression "fermentation residue" refers to the liquid or solid residue which remains after the anaerobic treatment of biomass in a biogas plant or sewage treatment plant.

For the purposes of the present invention, the expression "sludge substrate" refers to a nitrogen-containing, in particular ammonium salt-containing, sludge, preferably an organic sludge. The sludge substrate can be, for example, a sewage treatment sludge, in particular a raw sludge or treated sewage treatment sludge. In particular, the sludge substrate can be a primary sludge, excess sludge or putrefaction sludge.

For the purposes of the present invention, the expression "organic sludge" refers to materials and substrates which, for example, are converted into biogas under anaerobic conditions in a biogas plant.

For the purposes of the present invention, the expression "primary sludge" refers to a sludge formed generally by gravity sedimentation in settling tanks of a sewage treatment plant.

For the purposes of the present invention, the expression "excess sludge" refers to a sludge which is obtained in sewage treatment plants and consists predominantly of microorganisms, for example bacteria and protists.

For the purposes of the present invention, the expression "putrefaction sludge" refers to a stabilized sewage treatment sludge obtained by putrefaction in wastewater purification.

For the purposes of the present invention, the expression "ammonia gas" refers to a gas consisting of ammonia, i.e. pure ammonia gas, or an ammonia-containing gas mixture which contains not only ammonia but also further gases such as methane, carbon dioxide, hydrogen sulphide, water vapour or a mixture of at least two of the gases mentioned.

For the purposes of the present invention, the expression "ammonia" refers to the gaseous compound having the empirical formula $NH_3$.

For the purposes of the present invention, the expression "vacuum pump" refers to a pump for generating a vacuum or subatmospheric pressure, preferably subatmospheric pressure.

For the purposes of the present invention, the expression "scrubber" refers to an apparatus for separating off or precipitating or scrubbing out of (gaseous) ammonia from the gas phase. The ammonia is preferably separated off by reaction with an acid present in the scrubber. In this way, the ammonia is separated off or precipitated or scrubbed out from the gas phase in the form of an ammonium salt, preferably water-soluble ammonium salt. Depending on the acid used, the ammonium salt can be, for example, ammonium phosphate, ammonium sulphate, ammonium nitrate or a mixture of at least two of the ammonium salts mentioned.

For the purposes of the present invention, the expression "acid" refers to an acid which is introduced into the at least one scrubber for carrying out the process or with which said scrubber is supplied.

For the purposes of the present invention, the expression "at least one scrubber" can refer to one scrubber or a plurality of scrubbers, i.e. two or more scrubbers. The expression "at least one scrubber" preferably refers, for the purposes of the present invention, to two or three scrubbers, preferably three scrubbers, which will be discussed in more detail below. In particular, the at least one scrubber can be the first scrubber described in more detail below. Furthermore, the at least one scrubber can be the first and second scrubbers described in more detail below. Furthermore, the at least one scrubber can also be the first, second and third scrubbers described in more detail below.

For the purposes of the present invention, the expression "ammonium salt-containing liquid" refers to a preferably acidic aqueous liquid, in particular a preferably acidic aqueous suspension or a preferably acidic solution, which contains an ammonium salt such as ammonium phosphate, ammonium sulphate, ammonium nitrate or a mixture of at least two of the ammonium salts mentioned, preferably in dissolved form. The pH of the liquid depends on the proportion of acid which is still present in the liquid. If the acid has been completely or essentially completely neutralized (by reaction with ammonia), the pH of the liquid is preferably exclusively or essentially exclusively dependent on the concentration of the ammonium ions present in the liquid.

The invention displays, in particular, the following advantages: removal or outgassing of ammonia from the liquid or sludge substrate takes place mainly, in particular exclusively, in the degassing vessel. The subatmospheric pressure prevailing in the degassing vessel assists the transfer of ammonia from the liquid or sludge substrate, i.e. in the form of a liquid or sludge phase, into the gas phase, as a result of which the degassing process is intensified.

Further passage of ammonia gas from the degassing vessel in the direction of at least one scrubber is made possible or reinforced by the subatmospheric pressure produced in the at least one scrubber by means of the vacuum pump. In this way, a high degree of separation or precipitation of ammonia from the gas phase can be achieved in the at least one scrubber.

The application of subatmospheric pressure both to the degassing vessel and to the at least one scrubber also makes, in particular, the use of air or steam for stripping ammonia from the liquid or sludge substrate dispensable.

The spraying of the acid or ammonium salt-containing liquid back into the at least one scrubber particularly advantageously increases "the reactive surface area" of the acid or liquid, as a result of which more rapid and in particular more quantitative reaction with ammonia in the at least one scrubber can be achieved.

Cooling of the acid or ammonium salt-containing liquid before spraying back in can advantageously bring about removal of heat of reaction or neutralization evolved in the reaction of the acid or liquid with ammonia in the at least one vessel.

In a preferred embodiment, the ammonia gas is produced without use or feeding-in of a degassing fluid such as air or vapour, in particular steam, for example.

In a further embodiment, subatmospheric pressure is continuously, i.e. without interruptions, applied to the degassing vessel and the at least one scrubber. Effective and in particular quantitative degassing and separation or scrubbing-out of ammonia can be realized in this way.

In a further embodiment, a subatmospheric pressure of from 50 mbar to 950 mbar, in particular from 400 mbar to 900 mbar, preferably from 700 mbar to 800 mbar, is applied to the degassing vessel.

In a further embodiment, a subatmospheric pressure of from 50 mbar to 950 mbar, in particular from 400 mbar to 900 mbar, preferably from 700 mbar to 800 mbar, is applied to the at least one scrubber.

In a further embodiment, the subatmospheric pressure in the degassing vessel and the at least one scrubber is generated by means of the vacuum pump.

In a further embodiment, the vacuum pump is located downstream, preferably directly, of the at least one scrubber.

In a further embodiment, residual gas obtained in the at least one scrubber is discharged, preferably drawn off, by the vacuum pump.

For the purposes of the present invention, the expression "residual gas" refers to a gas consisting of ammonia or an ammonia-containing gas mixture which, compared to the ammonia gas, is obtained in (significantly) smaller amounts, in particular with a (significantly) smaller ammonia content, or an ammonia-free gas or ammonia-free gas mixture.

In a further embodiment, the liquid or sludge substrate is subjected to a pretreatment in order to shift the chemical equilibrium between ammonium ions and ammonia in the aqueous medium in the direction of ammonia before entry into the degassing vessel. More quantitative removal or precipitation of ammonia in the at least one scrubber can be particularly advantageously achieved in this way.

The liquid or sludge substrate is preferably heated, in particular by means of a heating device such as a heat exchanger or by means of steam injection, for example, before entry into the degassing vessel.

Heating of the liquid or sludge substrate shifts the ratio of ammonium ions to ammonia in favour of ammonia.

Preheating of the liquid or sludge substrate makes it possible, in particular, to achieve enrichment of ammonia present in dissolved form. This in turn creates the prerequisites for a virtually quantitative degassing or removal of ammonia from the liquid or sludge substrate, which in turn is a prerequisite for virtually quantitative ammonia removal or scrubbing-out. A further advantage is that preheating of the heating or sludge substrate, i.e. heating of the liquid or sludge substrate before entry into the degassing vessel, can make heating of the liquid or sludge substrate in the degassing vessel dispensable.

According to the invention, it can therefore be quite preferable for the liquid or sludge substrate not to be heated in the degassing vessel.

The liquid or sludge substrate is preferably heated to a temperature of from 10° C. to 90° C., in particular from 20° C. to 60° C., preferably from 30° C. to 40° C.

In a further embodiment, the liquid or sludge substrate is heated in the degassing vessel, in particular to temperatures as described in the previous paragraph.

In a further embodiment, a chemical for increasing the pH, preferably a caustic alkali, is added to the liquid or sludge substrate before entry into the degassing vessel, in particular before or after the above-described step of heating. Addition of a chemical which increases the pH, preferably caustic alkali, likewise enables the abovementioned chemical equilibrium between ammonium ions and ammonia to be shifted in the direction of ammonia. In this case, too, there is, in particular, enrichment of ammonia present in dissolved form, as a result of which larger amounts of ammonia can subsequently be degassed and/or separated off or scrubbed out.

In a further embodiment, a chemical for increasing the pH, preferably a caustic alkali, is fed into the degassing vessel.

In a further embodiment, a chemical for increasing the pH, preferably a caustic alkali, is added to the liquid or sludge substrate before entry into the degassing vessel, with additional feeding of a chemical for increasing the pH, preferably a caustic alkali, into the degassing vessel. An even greater enrichment of ammonia in the gas phase can be achieved in this way.

In a further embodiment, an inorganic caustic alkali or base, preferably sodium hydroxide, calcium hydroxide or potassium hydroxide, particularly preferably sodium hydroxide, is used as caustic alkali.

In a further embodiment, the liquid or sludge substrate is introduced only into a single degassing vessel to which a subatmospheric pressure is applied. In other words, in a further embodiment, the process is not operated using a plurality of degassing vessels to which subatmospheric pressure is applied. This contributes to a significant simplification of the process procedure.

In a further embodiment, liquid or sludge substrate which has been freed of ammonia is discharged, preferably continuously, from the degassing vessel. For this purpose, the liquid or sludge substrate is generally discharged via a substrate outlet, in particular a substrate outlet arranged at the bottom of the degassing vessel. The discharge of the liquid or sludge substrate from the degassing vessel is preferably effected by means of a pump. Continuous discharge of liquid or sludge substrate which has been freed of ammonia from the degassing vessel particularly advantageously makes it possible for the overall procedure to be carried out continuously.

In a further embodiment, the ammonia gas is cooled, in particular by means of a heat exchanger, after exit from the degassing vessel and in particular before entry into the at least one scrubber, preferably directly after exit from the degassing vessel. Water present in the ammonia gas is preferably recirculated in the condensed state into the degassing vessel. This makes it possible to achieve further enrichment of ammonia in the gas phase and in particular subsequent separating off of larger amounts of ammonia.

The ammonia gas is preferably cooled to a temperature of from 5° C. to 60° C., in particular from 10° C. to 50° C., preferably from 20° C. to 40° C.

In a further embodiment, the ammonia gas is freed of solid particles and/or liquid droplets, preferably by means of a filter, before entry into the at least one scrubber. The ammonia gas can, in particular, be freed of solid particles and/or liquid droplets by means of a filter installed between the degassing vessel and the at least one scrubber. As a result, contamination of the at least one scrubber and thus impairment, in particular reduction, of its separation or scrubbing capability can be avoided and its period of operation can be increased.

In a further embodiment, the acid or ammonium salt-containing liquid is sprayed in the form of an acid or liquid mist back into the at least one scrubber.

In a further embodiment, the acid or ammonium salt-containing liquid is sprayed back into the at least one scrubber by means of a spraying device, in particular a spray nozzle. Particularly effective spraying of the acid or liquid within the at least one scrubber can be achieved in this way. The spraying device is preferably arranged within the at least one scrubber, i.e. in the interior of the at least one scrubber. As an alternative, the spraying device can open into the at least one scrubber.

In a further embodiment, the acid or ammonium salt-containing liquid is cooled by means of a cooling circuit before being sprayed back in.

The acid or ammonium salt-containing liquid is preferably conveyed through a liquid cooling apparatus, in particular a heat exchanger, by means of a pump, in particular a circulation pump, before being sprayed back in.

The acid or the ammonium salt-containing liquid is preferably cooled to a temperature of from 5° C. to 70° C., in particular from 20° C. to 50° C., preferably from 30° C. to 40° C.

In a further embodiment, the pH of the acid or ammonium salt-containing liquid is monitored. Monitoring of the pH can in principle be carried out in the at least one scrubber or outside the at least one scrubber, in particular in the abovementioned cooling circuit. For example, the pH can be monitored upstream of the abovementioned pump, in particular circulation pump, upstream of the abovementioned liquid cooling apparatus or downstream of the abovementioned liquid cooling apparatus. The pH is preferably monitored upstream of the liquid cooling apparatus since the pressure conditions there are most favourable for measurement of the pH.

In a further embodiment, the pH is monitored until the acid has been neutralized completely or essentially completely.

In a further embodiment, an ammonium salt-containing liquid present after neutralization of the acid is discharged from the at least one scrubber after the latter has been vented. The discharged ammonium salt-containing liquid can be passed to further processing, preferably the production of nitrogen fertilizer. After discharge of the ammonium salt-containing liquid, fresh acid can be introduced into or applied to the at least one scrubber.

In a further embodiment, a plurality of, in particular two or three, preferably three, scrubbers to which subatmospheric pressure is applied and into which acid is introduced are used.

Preference is given to using a plurality of, in particular two or three, preferably three, scrubbers to which subatmospheric pressure is applied and into which acid is introduced and which are connected in series, i.e. after one another. The vacuum pump is in this case preferably located, preferably directly, downstream of the last scrubber connected in series.

In a further embodiment, the ammonia gas is conveyed by means of the vacuum pump into a first scrubber to which subatmospheric pressure is applied and into which acid is introduced and a residual gas obtained in the first scrubber is conveyed by means of the vacuum pump into a second scrubber to which subatmospheric pressure is applied and into which acid is introduced. The second scrubber is preferably located downstream, particularly preferably directly, of the first scrubber.

The first scrubber preferably serves to separate off or scrub out the main loading of the ammonia from the ammonia gas. The second scrubber is preferably provided in order to make any residual removal or residual precipitation of ammonia from the residual gas possible. Very effective and in particular quantitative separation or precipitation of ammonia from the gas phase can be achieved in this way.

In a further embodiment, a subatmospheric pressure of from 50 mbar to 950 mbar, in particular from 400 mbar to 900 mbar, preferably from 700 mbar to 800 mbar, is applied to the first scrubber and to the second scrubber.

In a further embodiment, the first scrubber is exchanged with the second scrubber when the residual gas obtained in the first scrubber has an ammonia content or an ammonia concentration above a defined threshold value, preferably above 10 ppm (parts per million). Attainment of the threshold value indicates that the acid in the first scrubber has been completely or essentially completely neutralized and the first scrubber can therefore no longer take up any further ammonia, so that ammonia which has not been taken up now goes or would go into the second scrubber. Replacement of the first scrubber by the second scrubber is preferably carried out in such a way that the second scrubber assumes the position of the first scrubber. The second scrubber thus preferably takes over the function of the first scrubber. Exchange of the scrubbers also preferably occurs without venting of the second scrubber, i.e. with maintenance of the subatmospheric pressure prevailing in the second scrubber.

Preferably, the first scrubber which has been replaced is, after venting, emptying and renewed introduction of acid, installed downstream, preferably directly downstream, of the second scrubber and subatmospheric pressure is subsequently applied to it by means of the vacuum pump. As an alternative, another scrubber into which acid is introduced can be installed downstream, preferably directly downstream, of the second scrubber and subsequently have subatmospheric pressure applied to it by means of the vacuum pump. The replacement of the second scrubber by the first or other scrubber is preferably carried out in such a way that the first or other scrubber assumes the position of the second scrubber. The first or other scrubber therefore preferably takes over the function of the second scrubber.

The (mutual) exchange of the scrubbers is preferably carried out continuously, so that continuous removal of ammonia can be realized.

In a further embodiment, the vacuum pump is located downstream, preferably directly downstream, of the second scrubber.

In a further embodiment, residual gas obtained in the second scrubber is discharged, preferably drawn off, by the vacuum pump.

As regards further features and advantages of the first scrubber and of the second scrubber, reference is made in full to what has been said in respect of the at least one scrubber in the above description. What has been said in this respect preferably applies (analogously) to the first scrubber and/or second scrubber.

In a particularly preferred embodiment, a residual gas obtained in the first scrubber is introduced into a third scrubber to which subatmospheric pressure is applied and into which acid is introduced. The third scrubber is preferably located downstream, particularly preferably directly downstream, of the second scrubber.

The third scrubber preferably serves as a type of reserve scrubber. However, the third scrubber can, if necessary, be used for residual removal or residual precipitation of ammonia from the residual gas obtained in the second scrubber, as a result of which a more effective and more quantitative removal or precipitation of ammonia can be achieved overall.

According to the invention, it is thus particularly preferred for the ammonia gas to be conveyed by means of the vacuum pump through a first scrubber to which subatmospheric pressure is applied and into which acid is introduced, a residual gas obtained in the first scrubber to be conveyed by means of the vacuum pump into a second scrubber to which subatmospheric pressure is applied and into which acid is introduced and which is installed preferably directly downstream of the first scrubber, and a residual gas obtained in the second scrubber to be conveyed by means of the vacuum pump into a third scrubber to which subatmospheric pressure is applied and into which acid is introduced and which is installed preferably directly downstream of the second scrubber.

In a further embodiment, a subatmospheric pressure of from 50 mbar to 950 mbar, in particular from 400 mbar to 900 mbar, preferably from 700 mbar to 800 mbar, is applied to each of the first scrubber, the second scrubber and the third scrubber.

In a further embodiment, the first scrubber is exchanged with the second scrubber and the second scrubber is exchanged with the third scrubber when the residual gas obtained in the first scrubber has an ammonia content or an ammonia concentration above a defined threshold value, preferably above 10 ppm (parts per million). Attainment of the threshold value indicates that the acid in the first scrubber has been completely or essentially completely neutralized and the first scrubber therefore can no longer take up any further ammonia, so that ammonia which has not been taken up now goes or would go into the second scrubber. Replacement of the first scrubber by the second scrubber and of the second scrubber by the third scrubber is preferably carried out in such a way that the second scrubber assumes the position of the first scrubber and the third scrubber assumes the position of the second scrubber. The second scrubber thus preferably takes over the function of the first scrubber and the third scrubber preferably takes over the function of the second scrubber. The exchange of the scrubbers also preferably occurs without venting of the second scrubber and the third scrubber, i.e. with maintenance of the subatmospheric pressure prevailing in the second scrubber and in the third scrubber.

The replaced first scrubber is, after venting, emptying and renewed introduction of acid, preferably installed downstream, preferably directly downstream of the third scrubber and subatmospheric pressure is subsequently applied to it by means of the vacuum pump. As an alternative, another scrubber into which acid is introduced can be installed downstream, preferably directly downstream, of the third scrubber and subatmospheric pressure can subsequently be applied to it by means of the vacuum pump.

The replacement of the third scrubber by the first or other scrubber is preferably carried out in such a way that the first or other scrubber assumes the position of the third scrubber. The first or other scrubber thus preferably assumes the function of the third scrubber.

The (mutual) exchange of the scrubbers is preferably carried out continuously so that continuous removal of ammonia can be realized.

In a further embodiment, the vacuum pump is located downstream, preferably directly downstream, of the third scrubber.

In a further embodiment, residual gas obtained in the third scrubber is discharged, preferably drawn off, by the vacuum pump.

As regards further features and advantages of the first scrubber, of the second scrubber and of the third scrubber, reference is made in full to what has been said in respect of the at least one scrubber in the above description. What has been said in this respect preferably applies (analogously) also to the first scrubber, second scrubber and/or third scrubber.

In a further embodiment, an inorganic acid, in particular a medium-strength acid and/or a mineral acid, preferably phosphoric acid, sulphuric acid, nitric acid or a mixture of at least two of the mineral acids mentioned, is used as acid. In other words, in a further embodiment the at least one scrubber, in particular the above-described scrubbers (first and second scrubbers or first, second and third scrubbers), has an inorganic acid, in particular a medium-strength acid and/or a mineral acid, preferably phosphoric acid, sulphuric acid, nitric acid or a mixture of at least two of the mineral acids mentioned, introduced into or supplied to the scrubber(s).

In a further embodiment, an organic acid, in particular carbonic acid, acetic acid, citric acid or a mixture of at least two of the organic acids mentioned, is used as acid. In other words, in a further embodiment the at least one scrubber, in particular the above-described scrubbers (first and second scrubbers or first, second and third scrubbers), has an organic acid, in particular carbonic acid, acetic acid, citric acid or a mixture of at least two of the organic acids mentioned, introduced into or supplied to the scrubber(s).

In a further embodiment, the process is carried out continuously, i.e. without interruption of the process sequence.

Further features and advantages of the process can be derived from the following description of a plant according to the invention. What is said below can therefore also be applied (analogously) to the process of the invention.

In a second aspect, the invention provides a plant for separating off and/or recovering nitrogen compounds, in particular for separating off ammonia and/or recovering or producing nitrogen fertilizer, from a liquid or sludge substrate.

In particular, the second aspect of the invention relates to a plant for carrying out a process according to a first aspect of the invention.

The plant comprises the following:
a degassing vessel for liberating ammonia gas from a liquid or sludge substrate,
at least one scrubber for separating off or scrubbing out ammonia from a gas phase located downstream of the degassing vessel, where the at least one scrubber has a spray device for spraying acid or an ammonium salt-containing liquid, and
a vacuum pump for applying subatmospheric pressure to the degassing vessel and for applying subatmospheric pressure to the at least one scrubber.

In a preferred embodiment, the vacuum pump is located preferably directly downstream of the at least one scrubber.

In a further embodiment, the degassing vessel has internals which are configured for bringing about an increase of exchange areas between a liquid or sludge substrate and a gas phase. In this way, the removal or outgassing of ammonia from a liquid or sludge substrate can be assisted.

In a further embodiment, the plant also has a heating device, preferably a heat exchanger or a steam injection device, located upstream of the degassing vessel. The heating device is preferably configured for effecting preheating of a liquid or sludge substrate.

In a further embodiment, the plant also has a gas cooling apparatus located downstream, preferably directly downstream, of the degassing vessel. The gas cooling apparatus is preferably configured for effecting cooling of ammonia gas. The plant preferably also has a gas cooling apparatus located between the degassing vessel and the at least one scrubber. The gas cooling apparatus is preferably configured for effecting cooling of ammonia gas and/or condensation of gaseous water present in the ammonia gas. The gas cooling apparatus can be, in particular, a heat exchanger.

In a further embodiment, the plant also has a filter located upstream of the at least one scrubber. The plant preferably also has a filter located between the degassing vessel and the at least one scrubber, preferably a filter located between the gas cooling apparatus mentioned in the previous paragraph and the at least one scrubber. The filter is preferably configured for purifying ammonia gas of solid particles and/or liquid droplets.

The spraying device is advantageously configured for spraying acid or an ammonium salt-containing liquid within the at least one scrubber.

The spraying device is preferably arranged within the at least one scrubber or in the interior of the at least one scrubber. As an alternative, the spraying device can open into the at least one scrubber.

The spraying device is, in a further embodiment, configured in the form of a nozzle. In other words, the spraying device is, according to a further embodiment, a spray nozzle.

In a further embodiment, the plant also has a cooling circuit for cooling an acid or an ammonium salt-containing liquid.

The plant preferably also has a liquid cooling apparatus. The liquid cooling apparatus is preferably configured for cooling an acid or ammonium salt-containing liquid.

In a further embodiment, the plant also has a pump, in particular a circulation pump, located upstream of the liquid cooling apparatus. The pump is preferably configured for passing an acid or ammonium salt-containing liquid through a liquid cooling apparatus, in particular circulating an acid or ammonium salt-containing liquid in a cooling circuit.

In a further embodiment, the plant also has a pH measuring apparatus. The pH measuring apparatus can be arranged within or outside the at least one scrubber. The pH measuring apparatus is preferably arranged outside the at least one scrubber. Here, the pH measuring apparatus can be located upstream of the pump or liquid cooling apparatus mentioned in the previous paragraph or downstream of the liquid cooling apparatus. The pH measuring apparatus is particularly preferably located upstream of the liquid cooling apparatus because the pressure conditions for measuring the pH are most favourable there. The pH measuring apparatus is preferably configured for measuring the pH of an acid or ammonium salt-containing liquid.

In a further embodiment, the plant has a plurality of, in particular two or three, preferably three, scrubbers. The scrubbers are preferably connected in series, i.e. after one another. The vacuum pump is preferably located downstream, preferably directly downstream, of the last scrubber connected in series.

Furthermore, the plant preferably has a first scrubber and a second scrubber which is preferably located directly downstream of the first scrubber. In this case, the vacuum pump is preferably located downstream, preferably directly downstream, of the second scrubber.

The plant particularly preferably has a first scrubber, a second scrubber located preferably directly downstream of the first scrubber and a third scrubber located preferably directly downstream of the second scrubber. Preferably, in this case the vacuum pump is located preferably directly downstream of the third scrubber.

In a further embodiment, the plant is configured in such a way that the scrubbers are exchangeable, in particular exchangeable with one another.

In a further embodiment, an acid, in particular an inorganic acid, preferably medium strength acid and/or mineral acid, particularly preferably phosphoric acid, sulphuric acid, nitric acid or a mixture of at least two of the mineral acids mentioned, or an organic acid, in particular carbonic acid, acetic acid, citric acid or a mixture of at least two of the organic acids mentioned, is introduced into or supplied to the at least one scrubber, in particular the scrubbers mentioned in the previous paragraphs, preferably the first scrubber, second scrubber and optionally the third scrubber.

As regards further features and advantages of the plant, reference is made, inter alia, in full to what has been said in the context of the process of the invention as per the first aspect of the invention. What has been said there applies (analogously) also to the plant according to the invention.

Further features and advantages of the plant can be derived from the following description with the aid of a preferred exemplary embodiment with accompanying drawing. The embodiments described below serve merely to illustrate the invention by way of example, without restricting the invention thereto. Individual features can in each case be realized either alone or in combination with one another.

BRIEF DESCRIPTION OF THE DRAWINGS

The drawing shows:
FIG. 1: a block diagram of a plant for separating off and/or recovering nitrogen compounds from a liquid or sludge substrate with the process sequence for separating off and/or recovering nitrogen contents from a liquid or sludge substrate.

DETAILED DESCRIPTION OF THE PREFERRED EMBODIMENTS

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

The plant 1 shown schematically in FIG. 1 has a degassing vessel 7, three scrubbing stages 16*a*, 16*b*, 16*c* located downstream of the degassing vessel 7 and also a vacuum pump 8.

Each scrubbing stage 16*a*, 16*b*, 16*c* has a scrubber 17*a*, 17*b*, 17*c*. The scrubbers 17*a*, 17*b*, 17*c* are connected in series, i.e. after one another.

The scrubbers 17*a*, 17*b*, 17*c* are preferably exchangeable with one another, in particular in respect of their function and/or position.

Each of the scrubbers 17*a*, 17*b*, 17*c* has a spraying device 18*a*, 18*b*, 18*c*, in particular in the form of a nozzle.

In the plant 1 depicted, the second scrubber 17*b* is located downstream of the first scrubber 17*a* and the third scrubber 17*c* is located downstream of the second scrubber 17*b*.

The vacuum pump 8 is located essentially downstream of the last scrubber connected in series.

In the plant 1 depicted, the vacuum pump 8 is located downstream of the scrubber 17*c*.

The plant 1 preferably also has a heating device 3, in particular in the form of a heat exchanger, located upstream of the degassing vessel 7.

Furthermore, the plant 1 preferably has a gas cooling device 13 located preferably directly downstream of the degassing vessel 7 and, in particular, a filter 15 located between the gas cooling apparatus 13 and the first scrubber 17*a*.

Each scrubber 17*a*, 17*b*, 17*c* is preferably connected via a cooling circuit to a liquid cooling apparatus 23*a*, 23*b*, 23*c*, with a circulation pump 22*a*, 22*b*, 22*c* being located upstream of each liquid cooling apparatus 23*a*, 23*b*, 23*c*.

To measure the pH, each scrubbing stage 16*a*, 16*b*, 16*c* has a pH measuring apparatus 26*a*, 26*b*, 26*c*. The pH measuring apparatus 26*a*, 26*b*, 26*c* can be located essentially upstream of the circulation pump 22*a*, 22*b*, 22*c* or downstream of the liquid cooling apparatus 23*a*, 23*b*, 23*c*. As an alternative, each scrubber 17*a*, 17*b*, 17*c* can have a pH measuring apparatus 26*a*, 26*b*, 26*c*. However, the pH measuring apparatus 26*a*, 26*b*, 26*c* is preferably, as shown, located upstream of the liquid cooling apparatus 23*a*, 23*b*, 23*c* since the pressure conditions for a pH measurement are most favourable upstream of the liquid cooling apparatus 23*a*, 23*b*, 23*c*.

A process according to the invention during start-up of the plant 1 depicted schematically in FIG. 1 will be described below.

A subatmospheric pressure is applied preferably continuously to, in particular, the degassing vessel 7 and also the three scrubbers 17*a*, 17*b*, 17*c* by means of the vacuum pump 8.

Liquid or sludge substrate is introduced via a substrate feed conduit 2 into the degassing vessel 7. Owing to the subatmospheric pressure prevailing there, increased formation of ammonia gas 12 occurs in the degassing vessel 7. The ammonia gas 12 is preferably formed predominantly or exclusively in the degassing vessel 7 because of the subatmospheric pressure prevailing therein.

To increase exchange areas between the liquid or sludge substrate and the gas phase, the degassing vessel 7 preferably has appropriate internals 9. The transfer of gaseous ammonia from the liquid or sludge substrate into the gas phase can be promoted thereby.

The liquid or sludge substrate is preferably conveyed through the heating apparatus 3 before entry into the degassing vessel 7. The liquid or sludge substrate is heated thereby, so that the ratio of ammonium ions to ammonia is shifted in favour of ammonia even before entry into the degassing vessel 7.

Furthermore, preference is given to adding a caustic alkali 6 to the liquid or sludge substrate before entry into the degassing vessel 7. The associated pH increase likewise makes a shift in the ratio of ammonium ions to ammonia in favour of ammonia possible even before entry of the liquid or sludge substrate into the degassing vessel 7. Here, the caustic alkali 6 can be added to the liquid or sludge substrate via an alkali feed conduit 4 and/or via an alkali feed conduit 5. Depending on the introduction of caustic alkali, a pH increase in the liquid or sludge substrate before or after passage through the heating apparatus 3 can thus also be achieved.

Liquid or sludge substrate which is obtained in the degassing vessel 7 and has been freed of ammonia is preferably discharged continuously from the degassing vessel 7 via a discharge conduit 10 by means of a vacuum pump 11.

To effect further enrichment of ammonia in the gas phase, the ammonia gas 12 is passed through the gas cooling apparatus 13. Here, the ammonia gas 12 is cooled and water present in the ammonia gas 12 is recirculated as condensate 14 to the degassing vessel 7. After leaving the gas cooling apparatus 13, the ammonia gas 12 is preferably passed through the filter 15. Here, the ammonia gas 12 is purified of any solid particles and/or liquid droplets.

The purified ammonia gas 12 is then introduced by means of the vacuum pump 8 into the first scrubber 17*a*. An acid, preferably phosphoric acid, sulphuric acid or nitric acid, is introduced into this scrubber. The introduction of acid into the scrubber 17*a* can be effected by means of an acid feed conduit 20*a*.

In the scrubber 17*a*, ammonia is converted into a preferably water-soluble ammonium salt, for example ammonium phosphate, ammonium sulphate or ammonium nitrate, by reaction with the acid and thus separated off or scrubbed out from the gas phase.

To cool the heat of reaction or neutralization arising here, acid 21*a* or an ammonium salt-containing liquid 21*a* formed by reaction of acid with ammonia which is taken off from the scrubber 17*a* is conveyed by means of the circulation pump 22*a* through the liquid cooling apparatus 23*a* and sprayed as cooled acid or liquid 21*a* back into the scrubber 17*a* via the spraying device 18*a*.

Spraying of the acid or liquid 21*a* enables the reaction with ammonia in the scrubber 17*a* to be accelerated and in particular carried out more quantitatively.

The pH of the acid or liquid 21*a* in the scrubbing stage 16*a* is monitored by means of the pH measuring apparatus 26*a*.

When the acid which has originally been introduced into the scrubber 17*a* has been largely or completely neutralized, the scrubber 17*a* can no longer take up any further ammonia and an ammonium salt-containing liquid present then is preferably discharged from the scrubber 17*a* via an outlet line 27*a* and passed to a further use, in particular for producing nitrogen fertilizers.

According to the invention, it can in principle be provided for an optionally ammonia-containing residual gas 28*a* obtained by neutralization of the acid in the scrubber 17*a* to be introduced by means of the vacuum pump 8 into the downstream second scrubber 17*b* and an optionally ammonia-containing residual gas 28*b* obtained there can optionally be introduced into the third scrubber 17*c*, with an optionally ammonia-containing residual gas 28*c* obtained in the third scrubber 17*c* being discharged, preferably drawn off, by the vacuum pump 8.

However, preference is given to exchanging the first scrubber 17*a* with the second scrubber 17*b* and exchanging the second scrubber 17*b* with the third scrubber 17*c* when a residual gas 28*a* obtained in the first scrubber 17*a* has an ammonia content or an ammonia concentration above a defined threshold value, preferably above 10 ppm. The exchange of the scrubbers is preferably carried out with maintenance of the subatmospheric pressure prevailing in each case in the second scrubber 17*b* and in the third scrubber 17*c*.

The first scrubber 17*a* is preferably installed, after venting, emptying and renewed introduction of acid, downstream of the third scrubber 17*c*.

As a result, the second scrubber 17*b* now assumes the function and in particular position of the first scrubber 17*a*, the third scrubber 17*c* assumes the function and in particular position of the second scrubber 17*b* and the scrubber 17*a* into which acid has again been introduced assumes, after having a subatmospheric pressure applied to it by the vacuum pump 8, the function and in particular position of the third scrubber 17*c*.

As a result, an acid contained in the scrubber 17*b* is now converted into a preferably water-soluble ammonium salt, for example ammonium phosphate, ammonium sulphate or ammonium nitrate, by reaction with ammonia and thus separated off or scrubbed out from the gas phase.

To cool the heat of reaction or neutralization arising here, acid 21*b* or an ammonium salt-containing liquid 21*b* formed by reaction of acid with ammonia which has been taken off from the scrubber 17*b* is conveyed by the circulation pump 22*b* through the liquid cooling apparatus 23*b* and sprayed as cooled acid or liquid 21*b* back into the scrubber 17*b* via the spraying device 18*b*.

Spraying of the acid or liquid 21*b* enables the reaction with ammonia in the scrubber 17*b* to be accelerated and in particular carried out more quantitatively.

The pH of the acid or liquid 21*b* in the scrubbing stage 16*b* is monitored by means of the pH measuring apparatus 26*b*.

When the acid which was originally introduced into the scrubber 17*b* has been largely or completely neutralized, the scrubber 17*b* can no longer take up any further ammonia and an ammonium salt-containing liquid then present is preferably discharged from the scrubber 17*b* via an outlet conduit 27*b* and passed to a further use, in particular for producing nitrogen fertilizers.

Preference is given to exchanging the second scrubber 17*b* with the third scrubber 17*c* and the third scrubber 17*c* with the first scrubber 17*a* when a residual gas 28*b* obtained in the second scrubber 17*b* has an ammonia content or an ammonia concentration above a defined threshold value, preferably above 10 ppm. The exchange of the scrubbers is preferably carried out with maintenance of the subatmospheric pressure prevailing in each case in the third scrubber 17*c* and in the first scrubber 17*a*.

The second scrubber 17*b* is preferably installed, after venting, emptying and renewed introduction of acid, downstream of the first scrubber 17*a*.

As a result, the third scrubber 17*c* now assumes the function and in particular position of the second scrubber 17*b*, the first scrubber 17*a* assumes the function and in particular position of the third scrubber 17*c* and the second scrubber 17*b* assumes, after a subatmospheric pressure has been applied to it by the vacuum pump 8, the function and in particular position of the first scrubber 17*a*.

As a result, acid now present in the scrubber 17*c* is converted into a preferably water-soluble ammonium salt, for example ammonium phosphate, ammonium sulphate or ammonium nitrate, by reaction with ammonia and thus separated off or scrubbed out from the gas phase.

To cool the heat of reaction or neutralization arising here, acid 21*c* or an ammonium salt-containing liquid 21*c* formed by reaction of acid with ammonia which has been taken off from the scrubber 17*c* is conveyed by means of the circulation pump 22*c* through the liquid cooling apparatus 23*c* and sprayed as cooled acid or liquid 21*c* back into the scrubber 17*c* via the spraying device 18*c*.

Spraying of the acid or liquid 21*c* enables the reaction with ammonia in the scrubber 17*c* to be accelerated and in particular more quantitatively.

The pH of the acid or liquid 21*c* in the scrubbing stage 16*c* is monitored by the pH measuring apparatus 26*c*.

When the acid which was originally introduced into the scrubber 17*c* has been largely or completely neutralized, the scrubber 17*c* can no longer take up any further ammonia and an ammonium salt-containing liquid which is then present is preferably discharged from the scrubber 17*c* via an outlet line 27*c* and passed to a further use, in particular the production of nitrogen fertilizers.

The above-described exchange of the scrubbers 17*a*, 17*b*, 17*c* can in principle be repeated or continued as often as desired.

A residual gas 29 obtained in the last scrubber is preferably discharged, preferably drawn off, by the vacuum pump 8.

Particularly advantageously, continuous exchange of the scrubbers 17*a*, 17*b* and 17*c* makes it possible for ammonia to be removed continuously from the liquid or sludge substrate and for ammonia to be continuously converted into preferably water-soluble ammonium salts. As a result, a particularly high degree of outgassing of ammonia and a particularly high degree of precipitation of ammonia in the form of water-soluble ammonium salts can be achieved.

Thus it is apparent that there has been provided, in accordance with the invention, an invention that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A process for separating off and/or recovering nitrogen compounds from a liquid or sludge substrate, in which the liquid or sludge substrate is introduced into a degassing vessel to which subatmospheric pressure is applied and ammonia gas formed is introduced by means of a vacuum pump into at least one scrubber which is located downstream of the degassing vessel and to which subatmospheric pressure is applied and into which acid is introduced, wherein the acid or an ammonium salt-containing liquid obtained in the at least one scrubber is taken off from the at least one scrubber, cooled and subsequently sprayed back into the at least one scrubber, wherein the ammonia gas is introduced by means of the vacuum pump into a first scrubber to which subatmospheric pressure is applied and into which acid is introduced and a residual gas obtained in the first scrubber is introduced by means of the vacuum pump into a second scrubber to which subatmospheric pressure is applied and into which acid is introduced and which is located downstream of the first scrubber, wherein a residual gas obtained in the second scrubber is introduced by means of the vacuum pump into a third scrubber to which subatmospheric pressure is applied and into which acid is introduced and which is located downstream of the second scrubber, and wherein the first scrubber is exchanged with the second scrubber and the second scrubber is replaced by the third scrubber when a residual gas obtained in the first scrubber has an ammonia content above a defined threshold value.

2. The process according to claim 1, wherein the ammonium gas is produced without use of a degassing fluid, for example air or steam.

3. The process according to claim 1, wherein the subatmospheric pressure is continuously applied to the degassing vessel and the at least one scrubber.

4. The process according to claim 1, wherein the subatmospheric pressure in the degassing vessel and the subatmospheric pressure in the at least one scrubber are produced by the vacuum pump, with the vacuum pump being located downstream of the at least one scrubber and residual gas obtained in the at least one scrubber being discharged by the vacuum pump.

5. The process according to claim 1, wherein the liquid or sludge substrate is heated before entry into the degassing vessel.

6. The process according to claim 5, wherein the liquid or sludge substrate is heated, by one of a heat exchanger or by steam injection before entry into the degassing vessel.

7. The process according to claim 1, wherein a chemical for increasing the pH is added to the liquid or sludge substrate before entry into the degassing vessel, in particular before or after the step of heating.

8. The process according to claim 7, wherein the chemical for increasing the pH is a caustic alkali.

9. The process according to claim 8, wherein the caustic alkali is sodium hydroxide.

10. The process according to claim 1, wherein liquid or sludge substrate which has been freed of ammonia is continuously discharged from the degassing vessel.

11. The process according to claim 1, wherein the ammonia gas is cooled after exit from the degassing vessel and water present in the ammonia gas is recirculated in the condensed state to the degassing vessel.

12. The process according to claim 1, wherein the ammonia gas is freed of solid particles and/or liquid droplets before entry into the at least one scrubber.

13. The process according to claim 1, wherein the acid or the ammonium salt-containing liquid is cooled by means of a cooling circuit before being sprayed back in.

14. The process according to claim 13, wherein the acid or ammonia salt-containing liquid is conveyed by means of a circulation pump through a liquid cooling apparatus.

15. The process according to claim 1, wherein the pH of the acid or ammonium salt-containing liquid is monitored.

16. The process according to claim 1, wherein the pH is monitored until the acid has been completely or essentially completely neutralized.

17. The process according to claim 1, wherein an ammonium salt-containing liquid present after neutralization of the acid is discharged from the at least one scrubber.

18. The process according to claim 17, wherein the ammonium salt-containing liquid present after neutralization of the acid is passed to further processing after it is discharged from the at least one scrubber.

19. The process of claim 18 wherein the further processing is production of nitrogen fertilizer.

20. The process according to claim 1, wherein the threshold value is above 10 ppm.

21. The process according to claim 20, wherein the first scrubber after venting, emptying and renewed introduction of acid is connected downstream of the last scrubber connected in series.

22. The process according to claim 21, wherein the first scrubber after venting, emptying and renewed introduction of acid is connected to the second scrubber or third scrubber.

23. The process according to claim 1, wherein an inorganic acid, in particular a mineral acid, preferably hydrochloric acid, sulphuric acid, nitric acid or a mixture of at least two of the mineral acids mentioned, is used as acid.

* * * * *